July 2, 1963  G. E. PIHL  3,096,480
SELF-CALIBRATING VARIABLE RANGE PHASE METER
Filed Jan. 2, 1959  2 Sheets-Sheet 1

FIG. I

INVENTOR.
GEORGE E. PIHL
BY Porter, Chittick & Russell
ATTORNEYS

INVENTOR.
GEORGE E. PIHL
BY
Porter, Chittick & Russell
ATTORNEYS

United States Patent Office 3,096,480
Patented July 2, 1963

3,096,480
SELF-CALIBRATING VARIABLE RANGE
PHASE METER
George E. Pihl, Abington, Mass., assignor to Acton Laboratories, Inc., Acton, Mass., a corporation of Massachusetts
Filed Jan. 2, 1959, Ser. No. 784,751
5 Claims. (Cl. 324—83)

This invention relates to a precision phase meter and more particularly to an instrument for measuring the phase angle between two sinusoidal or non-sinusoidal voltages in the frequency range from 10 c.p.s. to 50 kc.

The primary object of this invention is to provide a new and improved type of phase meter adapted to measure phase angle by comparing corresponding zero-axis crossings of two sinusoidal or non-sinusoidal voltages.

Another object is to provide a new and improved phase meter characterized by broad frequency coverage, wide input dynamic range, and long-time stability and accuracy.

Figure 1:
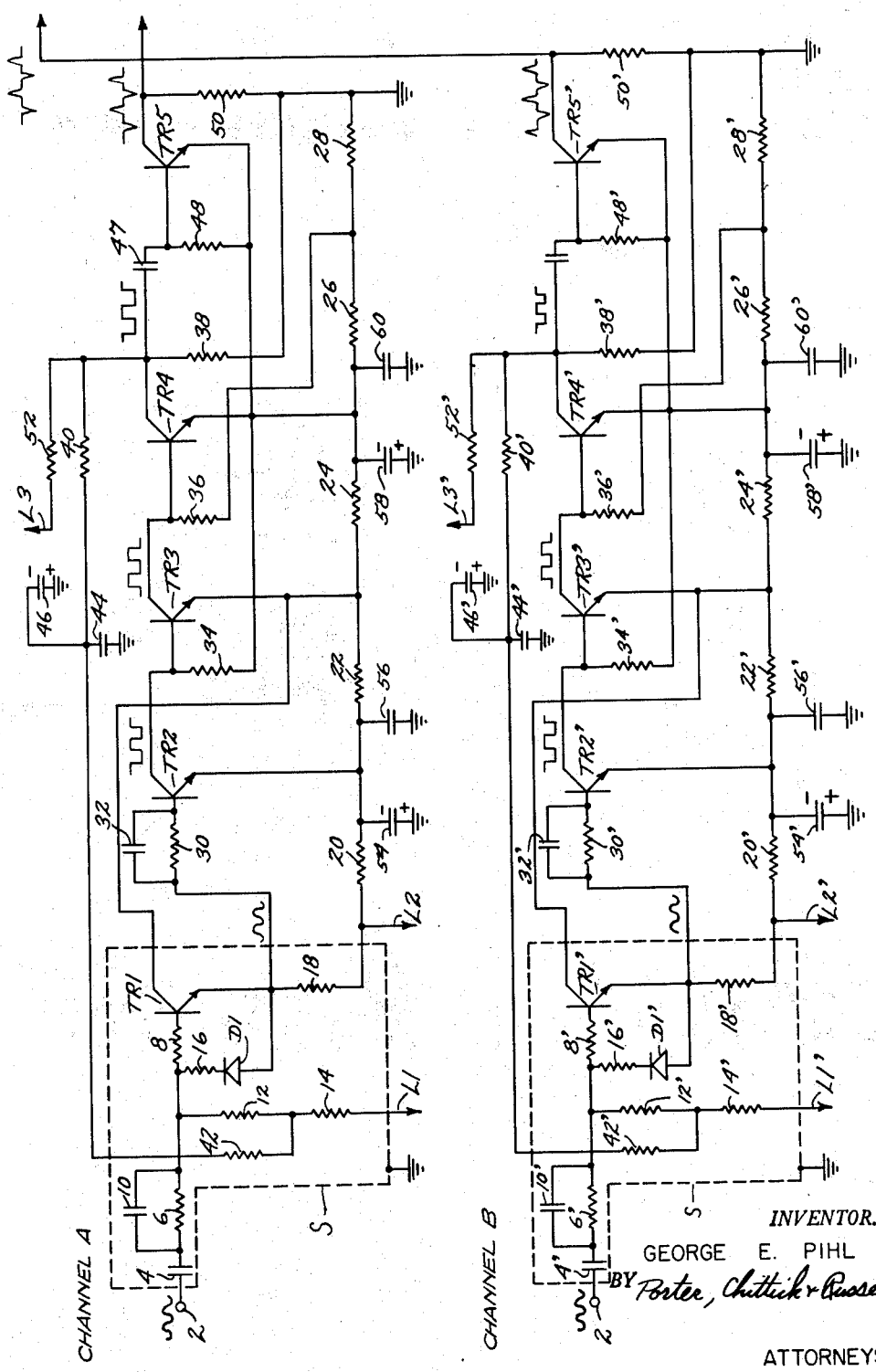
Figure 2:
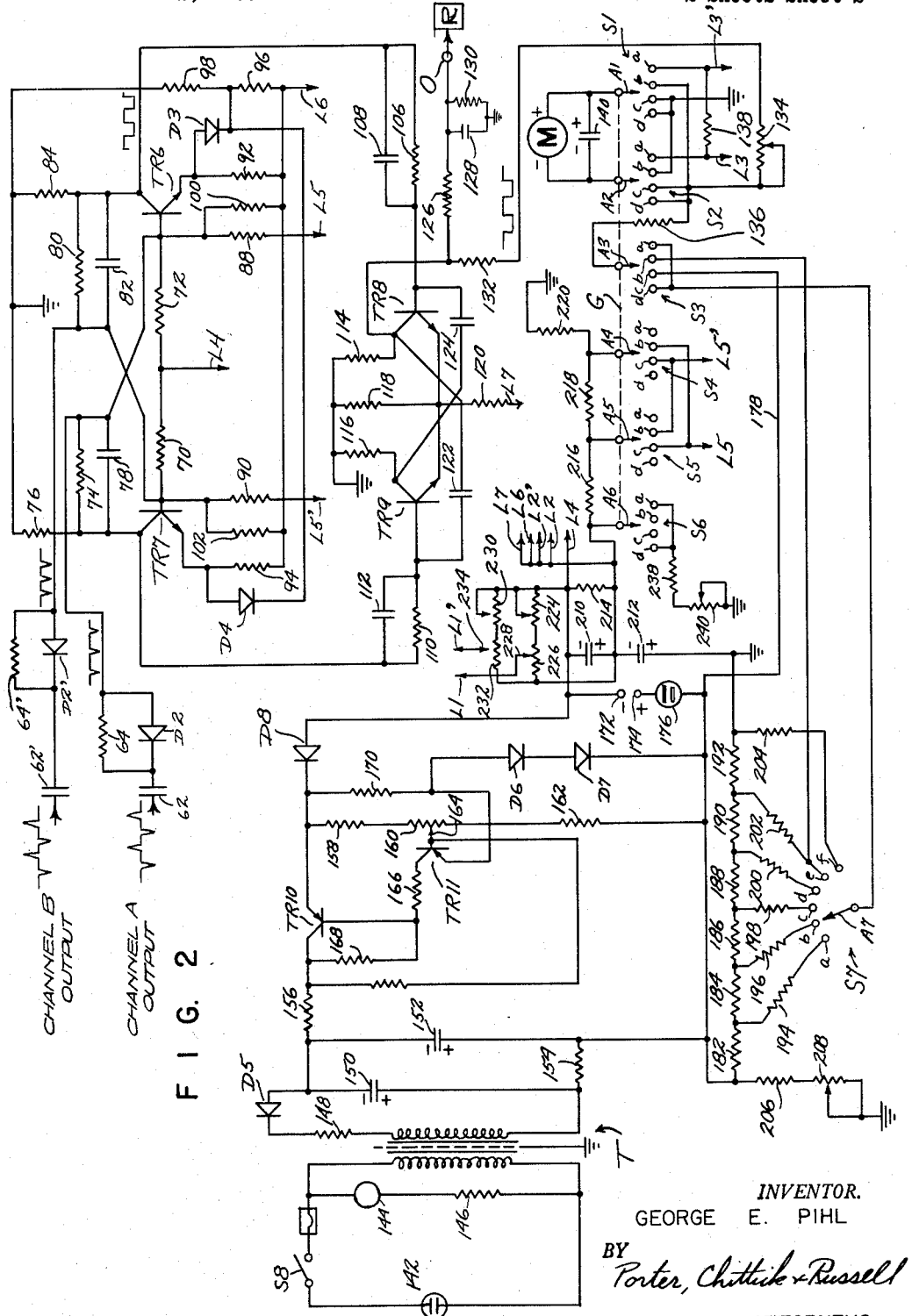

Other objects and many of the attendant advantages of the present invention will become apparent as reference is had to the following detailed specification when considered together with the accompanying drawings wherein:

FIG. 1 is a diagram of the two identical squaring channels to which are applied the two varying voltages whose phase relation is to be determined; and FIG. 2 is a diagram of the metering and power supply sections of the instrument.

Basically, the present invention comprises two pairs of input terminals to which are applied two periodic signals whose phase relation is to be compared, two squaring channels for converting the two input signals to square wave signals having the same frequency as the input voltages, means for differentiating the square wave signals to produce sharp pulses for each positive and negative going zero crossing, a flip-flop circuit, means for applying the sharp negative pulses produced by the negative going zero crossings of the signal in one channel to one section of said flip-flop, means for applying the sharp negative pulses produced by the negative-going zero crossings of the signal in the other channel to the second side of the flip-flop, and means responsive to the average value of output pulses from said flip-flop for indicating the angular separation of corresponding zero axis crossing of the two input signals.

Referring now to FIG. 1, the instrument comprises two identical channels A and B to which are applied two periodic signals whose phase relation is to be measured. Since the two channels are identical, the same numerals are employed to designate identical components. Each channel comprises an input terminal 2 which is connected to the base of a transistor TR1 by way of a capacitor 4 and resistors 6 and 8. A second capacitor 10 is connected across resistor 6. Connected between resistors 6 and 8 are two series-connected resistors 12 and 14. Resistor 14 is connected to a negative voltage source by lead L1. Also connected between resistors 6 and 8 is a resistor 16 which is coupled to the emitter of transistor TR1 by a rectifier D1. The emitter of transistor TR1 is connected by way of a load resistor 18 and a lead L2 to a negative voltage source. Also connected between lead L2 and ground is a voltage divider network consisting of resistors 20, 22, 24, 26, and 28.

To avoid interference between channels, the first stage of each channel is shielded as indicated by the broken line S. The first stage includes transistor TR1 which is connected as a grounded collector amplifier and functions as an impedance matching device similar to a cathode follower circuit. It has a high input impedance, a relatively low output impedance, and a gain of approximately 1. Proper collector voltage for transistor TR1 is provided by connecting its collector between resistors 22 and 24.

The output of the first stage is taken between the emitter of TR1 and ground and is applied to the base of transistor TR2 by means of a base resistor 30. Transistor TR2 is connected as a grounded emitter overdriven amplifier. Its emitter is connected between resistors 20 and 22. Proper collector voltage is achieved by connecting the collector to a load resistor 34 which in turn is connected between resistors 24 and 26. The output of the second stage is taken between the collector of TR2 and resistor 34 and is coupled directly to the base of TR3. The latter has its emitter connected between resistors 22 and 24 and its collector connected between resistors 26 and 28 by way of a load resistor 36. The collector of TR3 is coupled directly to the base of the fourth stage transistor TR4. The latter also is a grounded emitter amplifier, its emitter being connected between resistors 24 and 26. The collector of TR4 is connected to ground by way of a load resistor 38.

The three overdriven amplifier stages are centered around zero. To stabilize the level around which transistors TR2, 3, and 4 operate, a D.C. feedback network is provided between the collector of TR4 and the base of TR1. This network comprises a resistor 40 connected at one end between resistor 38 and the collector of TR4 and connected at the other end to a resistor 42 which is connected between resistors 12 and 14. Two capacitors 44 and 46 are connected to ground between resistors 40 and 42.

Assuming that the signal applied to the input terminal is sinusoidal, the output of TR1 will also be sinusoidal and in phase with the input signal. The second stage produces a square wave 180° out of phase with the input signal. The third and fourth stages improve the shape and amplify the square wave output of TR2 but also effect phase reversal so that the output of TR4 is a square wave 180° out of phase with the input signal.

The output of TR4 is taken between its collector and resistor 38 and applied to a differentiating circuit consisting of capacitor 47 and resistor 48. This differentiating circuit produces a series of alternately occurring negative and positive spikes. These spikes are applied to the base of a fifth transistor TR5. The latter has its emitter connected between resistors 24 and 26 and its collector connected to ground by way of a resistor 50. TR5 amplifies the trigger pulses or spikes produced by the differentiating circuit. The output is taken between the collector of TR5 and resistor 50.

Another resistor 52 is connected between the collector of TR4 and a lead L3 which is connected to the meter circuit described hereinafter.

It is to be noted that four capacitors are connected between ground and the voltage divider networks of each channel. Capacitor 54 is connected between resistor 20 and the emitter of TR2. Capacitor 56 is connected between the emitter of TR2 and resistor 22. Capacitor 58 is connected between resistor 24 and the emitter of TR4. Capacitor 60 is connected between the emitter of TR4 and resistor 26.

Referring now to FIG. 2, the output of channel A is applied to a transistorized flip-flop circuit by way of a capacitor 62 which in series with a crystal rectifier D2 is connected to the base of a transistor TR6. TR6 forms one half of the flip-flop circuit. Connected across rectifier D2 is a resistor 64. Rectifier D2 functions to pass only negative pulses or spikes. Although positive pulses produce some current flow through resistor 64, it is of negligible magnitude as far as operation of the flip-flop is concerned. The primary function of resistor 64 is to prevent the build-up of a charge on capacitor 62 since this would interfere with operation of the flip-flop. The output of channel B is applied to the base of a transistor TR7 by way of a capacitor 62', rectifier D2', and resistor 64'. D2' also passes only negative pulses. TR7 forms the other half of the flip-flop circuit.

The bases of TR6 and TR7 are connected by identical resistors 70 and 72. Resistors 70 and 72 are connected to a negative voltage source by a lead L4. The base of TR6 is connected to the collector of TR7 by a resistor 74. The collector of TR7 is connected to ground by a collector resistor 76. A capacitor 78 is connected in parallel with resistor 74. Similarly, the base of TR7 is connected to the collector of TR6 by a resistor 80 and a capacitor 82 connected in parallel with resistor 80. The collector of TR6 is connected to ground by a collector resistor 84.

The bases of TR6 and TR7 are connected by resistors 88 and 90 to leads L5 and L5' which are connected to the meter circuit as described hereinafter. The emitters of TR6 and TR7 are connected by way of resistors 92 and 94 to lead L6 which runs to a negative voltage source. Resistors 96 and 98 form a voltage divider network connected between ground and the negative voltage source to which lead L6 is connected. Rectifiers D3 and D4 are connected between the junction of resistors 96 and 98 and the emitters of TR6 and TR7 respectively. Additional resistors 100 and 102 are connected between the bases of TR6 and TR7 respectively and lead L6.

The output of the flip-flop is taken at the collector of TR6 and is applied by way of a resistor 106 to the base of a transistor TR8. A capacitor 108 is connected across resistor 106. To compensate for the loading effect of TR8 on the flip-flop, another transistor TR9 is balanced off against TR8. TR9 has its base coupled by a resistor 110 and a capacitor 112 to the collector of TR7. The collectors of TR8 and TR9 are connected to ground by way of resistors 114 and 116. Their emitters are connected to ground by a common resistor 118. Their emitters are also connected by a common resistor 120 to a lead L7 which connects to a negative voltage source. The collector of TR8 is coupled by a capacitor 122 to the base of TR9, and the collector of TR9 is coupled to the base of TR8 by a like capacitor 124.

The instrument includes a meter M which indicates the phase relation between the two signals applied to channels A and an output terminal O to which can be connected a recorder R to monitor the phase readings. The output from the phase measuring circuit is taken between the collector of TR8 and ground. Output terminal O is connected to the collector of TR8 by a resistor 126. Connected between terminal O and ground in parallel with each other are a capacitor 128 and a resistor 130.

The output of TR8 is applied to the meter circuit by way of a fixed resistor 132 and a variable resistor 134. The latter functions as a zero control.

The meter circuit employs a selector switch assembly comprising six rotary switches S1, S2, S3, S4, S5, and S6 having movable contact arms A1, A2, A3, A4, A5, and A6 respectively which are connected together as shown schematically by the dotted line G. Each switch has four contact terminals. The terminals of switch S1 are identified as $a$, $b$, $c$, and $d$. Corresponding terminals of the other switches are correspondingly identified.

Resistor 134 is connected to terminal $b$ of switch S1, terminals $c$ and $d$ of switch S2, and a resistor 136 which is connected in series with contact arm A3 of switch S3. Terminals $a$ of switches S1 and S2 are connected to leads L3' and L3 respectively of channels B and A. They are also connected to each other by a shunt resistor 138. Terminals $c$ and $d$ of switch S1 and contact $b$ of switch S2 are all connected to ground.

The meter M is connected as shown across contact arms A1 and A2. An integrating capacitor 140 is also connected across the terminals of the meter.

Switch S3 is connected to a range selector switch S7 and to a D.C. power supply.

The D.C. power supply comprises a transformer T whose primary winding is connected to a line plug 142 through an on-off switch S8. A pilot light 144 and resistance element 146 are connected across this winding. The secondary winding of transformer T1 is connected in series with a resistor 148, a rectifier D5, and a capacitor 150. A second capacitor 152 and a resistor 154 are connected in parallel with capacitor 150. Connected in parallel with capacitor 152 and in series with resistor 148 and rectifier D5 is a resistor 156 and the collector of a transistor TR10. The emitter of TR10 is connected in series with resistor 154 by way of resistors 158, 160, and 162. Resistor 160 is a potentiometer whose slider 164 is connected directly to the base of a transistor TR11. The collector of TR11 is connected by resistors 166 and 168 to the collector of TR10. The base of TR10 is connected between resistors 166 and 168. Connected in parallel to resistors 158, 160, and 162 is a resistor 170 and two reference diodes D6 and D7. The emitter of TR11 is connected between D6 and resistor 170. Connected in parallel with resistor 170 and reference diodes D6 and D7 is a rectifier D8, two terminals 172 and 174, and a female socket 176.

A common lead 178 connects resistors 154 and 162, diode D7, and female socket 176 to terminal $c$ of switch S3. Lead 178 connects these same elements to a range voltage divider network which is connected to range selector switch S7. This switch has six contact terminals $a$–$f$ and a rotatable contact arm A7. Contact arm A7 is connected to terminals $a$ and $d$ of switch S3. The range voltage divider network comprises six resistors 182, 184, 186, 188, 190, and 192 connected between lead 178 and ground. Six other resistors 194, 196, 198, 200, 202, and 204 are connected at one end between successive junctions of the six series-connected resistors 182–192 and at the other end to successive terminals $a$–$f$ of switch S7. Terminal $e$ of switch S7 is also connected to terminal $b$ of switch S3. Lead 178 is also connected to ground through a fixed resistor 206 and a variable calibration control resistor 208.

Connected to ground from terminal 172 are two capacitors 210 and 212. Connected across capacitor 210 is a resistor 214. Connected to resistor 214 and the junction of capacitors 210 and 212 are three series resistors 216, 218, and 220. The latter is also connected to ground. Arm A4 of switch S4 is connected between resistors 218 and 220; arm A5 between resistors 216 and 218; and arm A6 between resistors 214 and 216. Two additional resistor networks are connected in parallel across condenser 210. The first network comprises a variable resistor 224 and the resistor 226 of a potentiometer whose contact arm 228 is connected to lead L1 of channel A. The second network consists of a variable resistor 230 and the resistor 232 of a potentiometer whose contact arm 234 is connected to lead L1' of channel B.

Negative voltage for the bases of transistors TR6 and TR7 of the flip-flop circuit is obtained by lead L4 which is connected between resistor 214 and capacitor 210. Smaller negative voltages for channels A and B, the emitters of the flip-flop circuit and the emitters of the flip-flop output amplifier circuit are provided by leads L2, L2', L6, and L7 respectively which are connected between resistors 214 and 216.

Only two of the terminals of switches S4 and S5 are used. Terminal $b$ of S4 and terminal $c$ of S5 are connected to the flip-flop circuit by lead L5. Terminals $c$ of S4 and $b$ of S5 are connected to the flip-flop circuit by lead L5'. Moving switch arm A4 from terminal $b$ to $c$ reverses the operation of the flip-flop to facilitate calibration and zeroing of the meter circuit.

Two of the terminals of switch S6 are unconnected. The other two terminals $a$ and $d$ are connected to ground by a fixed resistor 238 and a variable resistor 240. This circuit compensates for variations in the load on the power supply.

In the preferred embodiment of the circuit of FIGS. 1 and 2, the following components are employed:

| Resistor: | Value in ohms | Resistor: | Value in ohms |
|---|---|---|---|
| 6 and 6' | 1M | 126 | 470K |
| 8 and 8' | 1K | 130 | 150K |
| 12 and 12' | 470K | 132 | 22K |
| 14 and 14' | 270K | 134 | 5K |
| 16 and 16' | 1K | 138 | 10K |
| 18 and 18' | 10K | 146 | 1.5M |
| 20 and 20' | 120 | 148 | 22 |
| 22 and 22' | 220 | 154 | 750 |
| 24 and 24' | 220 | 156 | 150 |
| 26 and 26' | 220 | 157 | 39K |
| 28 and 28' | 220 | 158 | 4.7K |
| 30 and 30' | 22K | 160 | 1K |
| 34 and 34' | 20K | 162 | 2.2K |
| 36 and 36' | 10K | 166 | 1.8K |
| 38 and 38' | 10K | 168 | 2.2K |
| 40 and 40' | 100K | 170 | 10K |
| 42 and 42' | 100K | 182 | 10 |
| 48 and 48' | 100K | 184 | 10 |
| 50 and 50' | 10K | 186 | 10 |
| 64 and 64' | 220K | 188 | 10 |
| 70 | 470K | 190 | 10 |
| 72 | 470K | 192 | 10 |
| 74 | 47K | 194 | 10 |
| 76 | 10K | 196 | 20 |
| 80 | 47K | 198 | 30 |
| 84 | 10K | 200 | 39 |
| 88 | 33K | 202 | 51 |
| 90 | 33K | 204 | 62 |
| 92 | 10K | 206 | 47 |
| 94 | 10K | 208 | 150 |
| 96 | 1K | 214 | 400 |
| 98 | 22K | 216 | 10K |
| 100 | 10K | 218 | 22K |
| 102 | 10K | 220 | 10K |
| 106 | 68K | 224 | 5K |
| 110 | 68K | 226 | 10K |
| 114 | 47K | 230 | 5K |
| 116 | 3.9K | 232 | 10K |
| 118 | 2.2K | 238 | 10K |
| 120 | 1.8K | 240 | 50K |

| Capacitor: | | Value |
|---|---|---|
| 4 and 4' | µf | .1 |
| 10 and 10' | µµf | 1.5–7 |
| 32 and 32' | µf | 50 |
| 44 and 44' | λf | .05 |
| 46 and 46' | µf | 20 |
| 47 and 47' | µµf | 15 |
| 54 and 54' | µf | 50 |
| 56 and 56' | µf | .05 |
| 58 and 58' | µf | 50 |
| 60 and 60' | µf | .05 |
| 62 and 62' | µµf | 25 |
| 78 | µµf | 15 |
| 82 | µµf | 15 |
| 108 | µµf | 25 |
| 112 | µµf | 25 |
| 122 | µµf | 10 |
| 124 | µµf | 10 |
| 128 | µf | .2 |
| 140 | µf | 50 |
| 150 | µf | 40 |
| 152 | µf | 40 |
| 210 | µf | 100 |
| 212 | µf | 100 |

| Transistor: | Type | Crystals: | Type |
|---|---|---|---|
| TR1 | 2N167 | D1 | 1N34 |
| TR2 | 2N168A | D1' | 1N34 |
| TR3 | 2N168A | D2 and D2' | 1N96 |
| TR4 | 2N168A | D3 | 1N96 |
| TR5 | 2N167 | D4 | 1N96 |
| TR1' | 2N167 | D5 | M500–1 |
| TR2' | 2N167 | D6 | SV9 |
| TR3' | 2N167 | D7 | SV9 |
| TR4' | 2N167 | D8 | M500–2 |
| TR5' | 2N167 | | |

Lead L4 supplies —42 volts, and leads L2, L2', L6, and L7 supply —23 volts.

Assuming that two signals to be compared for phase angle are applied to the input terminals of channels A and B, the circuit operates as follows:

Condensers 4 and 4' block out the D.C. components of the input signals and pass their A.C. components to the first stage transistors TR1 and TR1'. The A.C. components are applied between the bases of these transistors and ground. The diodes D1 and D1' compensate for the base-emitter characteristics of TR1 and TR1' respectively. The output from this first stage is taken between the emitter and ground and applied to the base of the second stage (TR2 and TR2'). The second, third, and fourth stages (TR2–TR4) are direct coupled clipper amplifiers which in the preferred embodiment saturate at about 50 millivolts input. Each of these stages produces a square wave output that is 180° out of phase with the signal applied to its base. These clippers are centered around the zero axis and are stabilized by the feedback from the collector of TR4 to the base of TR1. The zero axis is the average value of the applied voltage wave. Since the squaring channels are direct coupled, the zero axis crossings are preserved between the input terminal 2 and the fourth stage. In each channel, the output of the fourth stage is differentiated and amplified so as to produce a series of negative and positive trigger pulses. Only the negative pulses are passed by diodes D2 and D2', and these are applied to the flip-flop transistors TR6 and TR7.

Assuming that at a given instant transistor TR6 is on and transistor TR7 is off, a negative pulse passed by diode D2 will make the base of TR6 negative with respect to its emitter, thereby reducing its collector current and causing a corresponding increase in its collector voltage. This increased voltage is applied by way of condenser 82 to the base of TR7, causing the latter to conduct and producing a decrease in its collector voltage. This decrease in the collector voltage of TR7 is applied by way of condenser 78 to the base of TR6, driving TR6 to cutoff. A subsequent negative signal passed by diode D2' will make the base of TR7 negative, thereby reducing its collector current and increasing its collector voltage. The increase in collector voltage of TR7 is applied by way of condenser 78 to the base of TR6, causing the latter to conduct once more so as to produce a drop in its collector voltage. The drop in voltage is applied by way of condenser 82 to the base of TR7, driving the latter to cutoff. It is to be noted that condensers 78 and 82 hold their charge long enough for the pulse that caused the charging to disappear.

Since TR6 is turned off by negative pulses from channel A and turned on again when TR7 is turned off by negative pulses from channel B, the length of time that TR6 is turned off is determined by the phase relation of the signals from the two channels. The smaller the phase angle, the shorter the time that TR6 is turned off and the narrower the width of the square output pulses of the flip-flop.

The square wave output of the flip-flop, taken at the collector of TR6, is applied to and amplified by TR8. Capacitor 108 compensates for the input capacitance of TR8. Amplifier TR8 not only amplifies the flip-flop output but also isolates the flip-flop circuit from the loading effects of the meter and recorder. However, because of its base current, TR8 has a loading effect on TR6 which affects the stability of the flip-flop. Accordingly, TR9 is connected as illustrated to produce a corresponding loading effect on TR7, thereby compensating for TR8. TR8 is normally off and is turned on by the flip-flop output. TR8 remains off if the phase angle is zero and is on continuously if the phase angle is 360°. For phase angles between 0° and 360°, TR8 conducts for periods proportional directly to the pulse width of the output of TR6. The output of TR8 is applied to meter M which is calibrated to read directly in degrees of phase angle.

An important feature of the invention resides in the fact that no output voltage appears at recorder terminal O when the phase angle is zero. Thus, there is no need to establish a false or fictitious zero for the external recorder.

The instrument is used as follows: Plug 142 is connected to a 115 volt, 60 cycle A.C. power line, and switch S8 is closed. Then the two signals whose phase relation is desired are applied to terminals 2 of channels A and B. Thereafter, the instrument is balanced. This is done by closing the selector switch unit (consisting of switches S1, S2, S3, S4, S5, and S6) to switch terminals $a$ and noting the reading on the meter M, which will be approximately zero. Then the input signal is removed from channel A, and the A balance control (variable resistor 224) is adjusted to obtain the same reading as previously observed. This procedure is then repeated for channel B using the B balance control with the signal applied to channel A and removed from channel B. The B balance control is variable resistor 230. When properly balanced, the meter reading will be undisturbed by the removal of either signal with the other signal connected. It is to be noted that potentiometers 226 and 232 provide coarse balance control. Thereafter, the selector switch (consisting of switches S1, S2, S3, S4, S5, and S6) is operated to connect switch arms A1–A6 to switch terminals $b$, and the calibrate control (variable resistor 208) is adjusted for full scale on meter M.

Following calibration, the selector switch is closed to terminals $c$ and the zero control (variable resistor 134) is adjusted for zero on meter M.

After making the balance calibration, and zero adjustments (in that order), the selector switch is closed to terminals $d$. This is the use position, and the meter will now indicate the phase angle by which the input to channel A leads the input to channel B. The reading is determined by adjusting switch S7, which is the range switch, for an on-scale reading of the meter. The phase angle is the sum of the range switch setting and the meter reading. The meter scale extends from 0° to 60°. On-scale readings for phase angles of 0° to 60° are obtained when switch S7 is closed to terminal $f$. Similarly, on-scale readings for phase angles of 300° to 360° are obtained when switch S7 is closed to terminal $a$. Advancing switch arm A7 through terminals $b$ to $e$ provides on-scale readings when the phase angle is in the following ranges: 240–300°, 180–240°, 120–180°, and 60–120° respectively.

An analog voltage representation of the 0–360° range of the phase meter is available from the terminal O to which an external recorder may be connected. This voltage varies from zero to approximately 2 volts negative as the phase angle varies from zero to 360°. The recorder output is standardized by the calibrating and zeroing procedures outlined previously. However, with the selector switch closed to terminals $b$, zero recorder voltage is present; and with the selector switch closed to terminals $c$, maximum (360°) voltage is present.

The meter may be used where A.C. power is not available by employing a heavy duty 45 volt "B" battery. The battery is connected between terminals 172 and 174, observing the polarity indicated for these terminals; and plug 142 is connected into socket 176. This renders the instrument operative with application of power still controlled by switch S8. In the preferred embodiment, the current drain is approximately 50 ma.

It is to be noted that the output of amplifier TR8 causes upscale deflection of the meter in proportion to the average value of said output. The voltage developed across the D.C. voltage divider network is applied by way of switch S7 to the meter so as to cause downscale deflection of the meter. In the illustrated embodiment, the values of the resistors in the voltage divider network are such that the voltages developed at terminals $a, b, c, d, e,$ and $f$ of switch S7 are progressively smaller and differ by equal increments having a value sufficient to deflect the meter full scale.

In calibrating the instrument, the flip-flop is reversed so as to get a constant zero output. Thus, its effect on the meter reading is zero. At the same time, the meter connections are reversed so that the output from the voltage divider network applied to the meter causes upscale deflection. The calibration potentiometer 208 is then adjusted so that with the meter circuit connected to terminal $e$ of the voltage divider network, the meter is deflected full scale. Since the steps provided by the terminals of the voltage divider network are equal, each additional step will then provide additional suppression equal to full scale deflection.

Thereafter, the meter is connected back to its normal position, and the flip-flop is connected for maximum output. The meter circuit is then connected by way of lead 178 to the total voltage applied across the voltage divider network and the zero control adjusted so as to get a zero meter reading.

Thus, it is apparent that by using only two adjustable controls—namely, the zero and calibration controls—in combination with a voltage divider network having fixed equal resistances, there is provided fixed accurate zero suppression in any desired number of steps.

An instrument constructed according to the foregoing teachings can be used to determine the phase angles of signals having a frequency in the range of 10 cycles to 50 kilocycles. Moreover, the input signals can have an amplitude of .25 to 170 volts except at low frequencies, where at frequencies of 10, 100, and 500 cycles, the minimum voltage must be 10, 1, and .25 volts respectively. For input signals exceeding the above voltage requirements by 10 to 1 and over the range from 10° to 350°, the following table applies:

| Frequency: | Phase accuracy, ° |
|---|---|
| 10 c.p.s.–10 kc | 1 |
| 10 kc.–30 kc | 2 |
| 30 kc.–50 kc | 3 |

In general, for voltage below 10 times the minimum voltage requirements, an additional 1° error can be expected. The negative output voltage that is applied to the external recorder by way of terminal O is proportional to phase angle with the same accuracy as the meter indication.

One of the advantages of the present invention is its ability to measure the phase angle between non-sinusoidal as well as sinusoidal voltages. Another advantage is that it has broad frequency coverage, wide input dynamic range, and long-time stability and accuracy. Moreover, it is compact and portable and can be battery operated.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:
1. In a phase angle measuring system having a meter for providing a visual indication of phase angle, means for producing an analog signal voltage proportional to phase angle, and means for coupling said analog signal voltage to said meter whereby to cause upscale deflection of said meter, the improvement comprising an adjustable source of D.C. voltage, a voltage divider network con- nected across said voltage source, said network having a plurality of output taps providing a plurality of successively smaller output voltages which differ in magnitude by equal increments, means for selectively applying a voltage equal to the voltage between taps to said meter so as to cause upscale deflection of said meter, switch means for selectively connecting each tap to said meter whereby the output at each tap will cause downscale deflection of said meter, said voltage source adjustable to provide full scale deflection of said meter when simultaneously (1) said voltage equal to the voltage between taps is applied to said meter so as to produce upscale deflection of said meter and (2) said analog signal voltage is zero, and means for zeroing said meter when simultaneously (1) said analog signal voltage is at a maximum level and (2) the total voltage across said network is connected to said meter in opposition to said analog signal voltage.

2. In a phase measuring system comprising means for producing a resultant voltage of a predetermined polarity which is an analog of the phase angle between two periodic signals, the combination comprising a source of voltage having a polarity opposite to said analog voltage, a voltage divider network comprising a predetermined number of resistors of equal value connected in series between said voltage source and ground, a switch having a plurality of stationary contacts equal in number to said resistors, and also a movable contact for selectively engaging each of said stationary contacts, means connecting said stationary contacts to the ground sides of successive ones of said resistors, a meter, means for selectively coupling the voltage at said movable contact to said meter so as to produce downscale deflection of said meter, means for applying said analog voltage to said meter so as to produce an upscale deflection of said meter, means for adjusting the magnitude of the total voltage across said network whereby to produce a voltage drop across the resistor nearest to ground which has a magnitude equal to the voltage required to produce full upscale deflection of said meter when said analog voltage is zero, means for selectively applying the full voltage across said network to said meter in opposition to said analog voltage when said analog voltage is at its maximum level, and means for varying the magnitude of said analog voltage when it is at its maximum level, whereby to produce zero deflection of said meter when said analog voltage is opposed by the full voltage across said network.

3. Apparatus for indicating the phase angle between two periodic signals, said apparatus comprising a meter, means for producing a phase angle analog voltage, means for coupling said analog voltage to said meter so as to cause upscale deflection of said meter proportional to the magnitude of said analog voltage, a voltage divider network, a voltage source, means connecting said network to said voltage source, said network having a plurality of output taps providing successively smaller output voltages differing by equal increments, switch means connected between said meter and said network for selectively connecting each tap to said meter so as to produce downscale deflection thereof, means for disconnecting said switch means and coupling the total voltage across said network to said meter so as to produce downscale deflection thereof, means for adjusting the magnitude of said analog voltage to vary its effect on said meter whereby to obtain zero deflection of said meter when said analog voltage is at its maximum level and the total voltage across said network is coupled to said meter, and means for adjusting the total voltage across said network whereby to set the voltage increment between adjacent taps at a level sufficient to produce full scale deflection of said meter when said analog voltage is zero.

4. In a phase measuring system comprising means for producing a resultant negative voltage which is an analog of the phase angle between two periodic signals, the combination comprising a source of positive voltage, a resistive voltage divider network connected between said source of positive voltage and ground, said network having a series of taps providing a plurality of successively smaller output voltages which differ from each other and also from the total voltage across said network by equal increments, a meter, means for selectively applying each of said output voltages to said meter whereby each of said output voltages will produce downscale deflection of said meter, means for applying said analog voltage to said meter so as to produce upscale deflection thereof, means for adjusting the total voltage across said network whereby the magnitude of one of said increments is sufficient to provide full scale deflection of said meter when said analog voltage is zero, means for selectively applying the total voltage across said network to said meter in opposition to said analog voltage, and means for zeroing said meter whereby said meter will have zero deflection when subjected to the adjusted total voltage across said network in opposition to said analog voltage when said analog voltage is at its maximum level.

5. Apparatus for measuring phase angle between two alternating signals, said apparatus comprising means for producing a negative analog voltage which is zero at a phase angle of zero degrees and increases in value in proportion to increases in phase angle up to a maximum value at a phase angle of 360 degrees, a meter to which said analog voltage is applied so as to cause upscale deflection thereof, selectively operated means for alternately causing said analog voltage to be zero value and maximum value, a positive voltage source, a voltage divider network connected across said source, said network having a plurality of taps providing successively smaller positive voltages differing by equal increments, means for selectively connecting said taps to said meter so as to produce downscale deflection thereof, means for adjusting the total voltage across said network whereby the magnitude of said each increment of voltage is sufficient to produce full scale deflection of said meter when said analog voltage is zero, and means for adjusting the magnitude of said analog voltage whereby to obtain zero deflection of said meter when said phase angle is 360 degrees and the adjusted total voltage across said network is applied to said meter in opposition to said analog voltage.

References Cited in the file of this patent
UNITED STATES PATENTS

| | | |
|---|---|---|
| 2,370,692 | Shepherd | Mar. 6, 1945 |
| 2,413,389 | Smith | Dec. 31, 1946 |
| 2,459,081 | Kunz | Jan. 11, 1949 |
| 2,481,500 | Crowl | Sept. 13, 1949 |
| 2,513,477 | Gubin | July 4, 1950 |
| 2,513,528 | Sohon | July 4, 1950 |
| 2,533,769 | Couillard | Dec. 12, 1950 |
| 2,676,300 | Hirsch et al. | Apr. 20, 1954 |
| 2,725,528 | Werner | Nov. 29, 1955 |
| 2,874,354 | Bell | Feb. 17, 1959 |
| 2,877,416 | Grisdale | Mar. 10, 1959 |
| 2,963,648 | Baskin et al. | Dec. 6, 1960 |
| 2,989,701 | Gill | June 20, 1961 |

OTHER REFERENCES

Fundamentals for the Electrical Standards Laboratory, article in Electrical Measurements (II), Vol. 25, No. 4, April 1958.

Differential 63 Incrementer, Electrical Measurements, Vol. 27, No. 11, November 1958.

New Two-Method Phase Meter . . ., article in Instruments, January 1949, pages 40–41.

An Electronic Phasemeter, article in Proceedings of the IRE, Wanes & Electronics Section, February 1949, pages 207–210.

Measuring Phase at Audio and Ultrasonic Freqs., article in Electronics, October 1949, pages 114–118.

Calibration Circuit, Radio and Television News, December 1953, page 161.